United States Patent
Guo et al.

(10) Patent No.: US 6,353,678 B1
(45) Date of Patent: Mar. 5, 2002

(54) METHOD AND APPARATUS FOR DETECTING INDEPENDENT MOTION IN THREE-DIMENSIONAL SCENES

(75) Inventors: Yanlin Guo, Lawrenceville; Rakesh Kumar, Monmouth Junction; Harpreet Sawhney, West Windsor Township, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/614,690

(22) Filed: Jul. 13, 2000

Related U.S. Application Data
(60) Provisional application No. 60/143,906, filed on Jul. 14, 1999.

(51) Int. Cl.$^7$ .................................................. G06K 9/00
(52) U.S. Cl. ....................................... 382/154; 382/284
(58) Field of Search ................................ 382/154, 103, 382/107, 284, 128, 199, 106; 345/419, 427; 356/12

(56) References Cited

U.S. PATENT DOCUMENTS

| | | | | |
|---|---|---|---|---|
| 4,590,607 A | * | 5/1986 | Kauth | 382/294 |
| 5,259,040 A | | 11/1993 | Hanna | |
| 5,644,654 A | * | 7/1997 | Onokera | 345/144 |
| 5,821,943 A | | 10/1998 | Shashua | |
| 5,859,922 A | * | 1/1999 | Hoffmann | 382/128 |
| 6,049,619 A | * | 4/2000 | Anandan et al. | 382/107 |
| 6,137,491 A | * | 10/2000 | Szeliski | 345/419 |
| 6,192,145 B1 | * | 2/2001 | Anandan et al. | 382/154 |
| 6,198,852 B1 | * | 3/2001 | Anandan et al. | 382/284 |

FOREIGN PATENT DOCUMENTS
WO   WO 97/35161   9/1997

OTHER PUBLICATIONS

PCT International Search Report, May 21, 2001.

J. R. Bergen et al., "Hierarchical Model–Based Motion Estimation," Proceedings of European Conference on Computer Vision, 1992.

R. Cipolla et al., "Robust structure from motion using motion parallax," Proceedings of the Fourth International Conference on Computer Vision, pp. 374–382, Apr. 1993.

(List continued on next page.)

Primary Examiner—Joseph Mancuso
Assistant Examiner—Vikkram Bali
(74) Attorney, Agent, or Firm—William J. Burke

(57) ABSTRACT

A system and method that detects independently moving objects in 3D scenes which are viewed under camera motion progressively applies constraints to the images to ensure the stability of the constraints. The system first calculates 2D view geometry constraints for a set of images. These constraints are tested to determine if the imaged scene exhibits significant 3D characteristics. If it does, then 3D shape constraints, are applied to the set of images. The 3D shape constraints are themselves constrained by the 2D view geometry constraints. The set of images is then tested to identify areas that are inconsistent with the 2D or 3D constraints. These areas correspond to the moving objects. The 2D view geometry constraints are calculated by computing a dominant image alignment for successive pairs of images and then computing constrained epipolar transformations for the two image pairs. This 2D view geometry is further refined based on a plurality of target point correspondences among the plurality of frames. The epipolar geometry for the point correspondence having a minimum median error is selected as the 2D view geometry of the scene. The 3D shape constraint is a parallax geometry that is calculated by iteratively minimizing errors in a parametric alignment of the images using an estimated parallax geometry.

21 Claims, 3 Drawing Sheets

OTHER PUBLICATIONS

H.S. Sawhney, "Simplifying multiple motion and structure analysis using planar parallax and image Warping," Proceedings of the 1994 IEEE Workshop on Motion of Non-Rigid and Articulated Objects, pp. 104–109.

G. Adiv, "Determining 3D Motion and Structure from Optical Flows Generated by Several Moving Objects," IEEE PAMI, pp. 384–401, 1985.

P. H.S. Torr et al., "Robust Prameterization and Computation of the Trifocal Tensor," Image and Vision Computing, vol. 15, pp. 591–605, 1997.

M. Irani et al., "Computing Occluding and Transparent Motions," International Journal of Computer Vision, vol. 12, pp. 5–16, 1994.

Z. Zhang, et al., "A Robust Technique for Matching Two Uncalibrated Images Through the Recovery of the Unknown Epipolar Geometry," Institut National de Recherche en Informatique et en Automatique, No. 2273, May 1994.

Kumar, et al., "Direct recovery of shape from multiple views: a parallax based approach," Proc $12^{th}$ IAPR International Conf on Pattern Recognition, Jerusalem, Israel, Oct. 1994, p. 685–688.

* cited by examiner

METHOD AND APPARATUS FOR DETECTING INDEPENDENT MOTION IN THREE-DIMENSIONAL SCENES

This application claims benefit of the filing date of provisional application Ser. No. 60/143,906 filed Jul. 14, 1999.

GOVERNMENT RIGHTS

This invention was made with Government support under Contract No. MDA972-97-C-0033 awarded by the Department of the Army. The Government has certain rights in this invention.

FIELD OF THE INVENTION

The present invention relates generally to the detection of independently moving objects in a sequence of two-dimensional video images representing a three-dimensional (3D) video scene and in particular, to a method that uses a multi-view camera motion constraint and a shape constancy constraint.

BACKGROUND OF THE INVENTION

Automatic methods for processing images of a 3D scene to detect motions that are independent of camera motion are used in applications such as aerial video surveillance and monitoring, rapid model building under uncontrolled scenarios and moving object tracking. The 2D image motion in the scenarios under consideration can be attributed to the camera motion, the shape of the 3D scene and objects, and independent object motion. Automatic methods for solving the problem need to deal with the confounding effects of the various causes of image motion. It may be difficult, for example, to detect a moving object in a scene imaged by a moving camera if the object moves in the same direction as the camera motion.

A particularly difficult case of 3D scenes are sparse 3D scenes in which the "3Dness" of the scene is sparsely distributed and the image parallax for the fixed scene and the independent motions may be equally dominant.

Previous attempts to automatically detect independent motion in 3D scenes have either employed only the epipolar constraints or have assumed that frame correspondences and/or image flows are available or can be reliably computed. One such system, described in an article by G. Adiv entitled "Determining 3D Motion and Structure from Optical Flows Generated by Several Moving Objects," *IEEE Transactions on Pattern Analysis and Machine Intelligence*, vol. 7, no. 4, pp. 384–401, 1985. The system disclosed in this article assumes that the optical flow for the sequence of images is available and uses this flow to label points that belong to planes. Subsequently, the planar hypotheses are grouped on the basis of a rigidity constraint over two frames. In essence an epipolar constraint is applied to groups of planes.

Epipolar constraints may produce erroneous results, however, when independent object motion is in the same direction as camera motion. In this instance, the epipolar constraints may erroneously be calculated based on the independent object motion instead of the underlying scene. Image flows are time consuming to calculate and are subject to error, for example, if items in one frame are erroneously classified as matching objects in another frame.

SUMMARY OF THE INVENTION

The subject invention is embodied in a system and method that detects independently moving objects in 3D scenes that are viewed under camera motion. The subject invention first calculates 2D view geometry constraints for a set of images. These constraints are tested to determine if the imaged scene exhibits significant 3D characteristics. If it does, then 3D shape constraints, are applied to the set of images. The 3D shape constraints are themselves constrained by the 2D view geometry constraints. The set of images is then tested to identify areas that are inconsistent with the constraints. These areas correspond to the moving objects.

According to one aspect of the invention, the 2D view geometry constraints are calculated by computing a dominant image alignment for successive pairs of images and then computing constrained epipolar transformations for the two image pairs.

According to another aspect of the invention, the 2D view geometry is calculated based on a plurality of target point correspondences among the plurality of frames. The geometry corresponding to a minimum median error is selected as the 2D view geometry of the scene.

According to yet another aspect of the invention, the 3D shape constraint is a parallax geometry that is calculated by iteratively minimizing errors in a parametric transformation using an estimated parallax geometry, over a plurality of images.

DETAILED DESCRIPTION OF THE INVENTION

Figure 1:
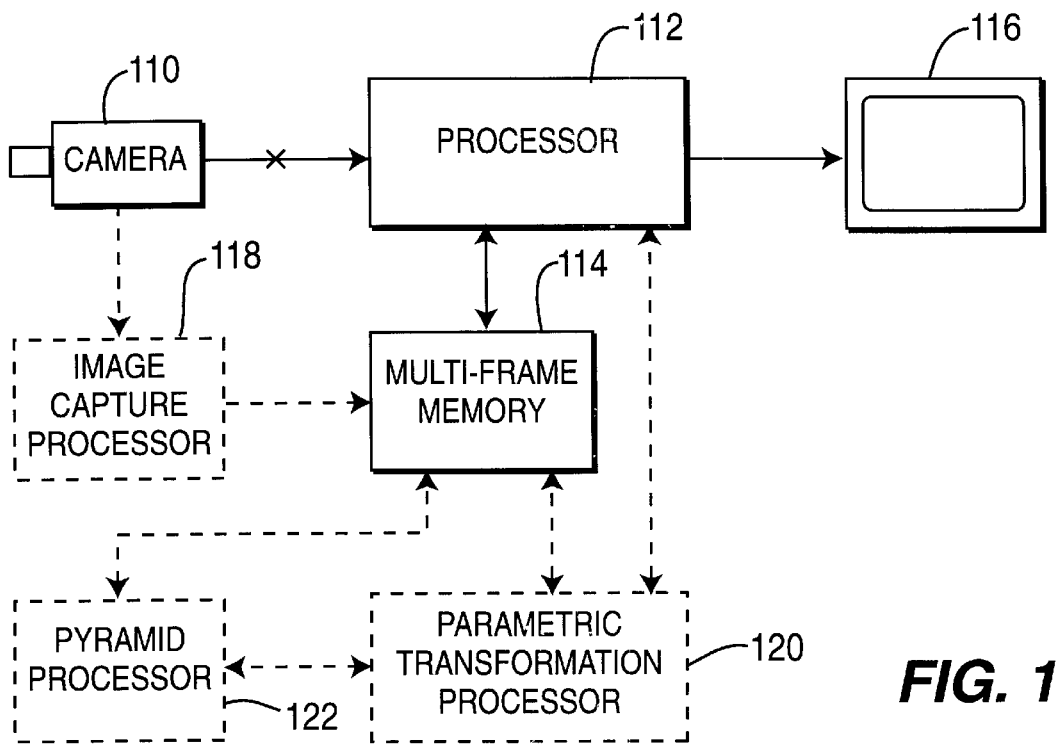
FIG. 1 is a functional block diagram of an image processing system suitable for use with the present invention.

The present invention processes images to detect motion using an algorithm that employs view geometry and shape constraints with progressive complexity. The inventors have determined that this algorithm works particularly well on sparse 3D scenes. The algorithm also works well on 2D scenes and other types of 3D scenes.

There are two fundamental constraints that apply to the static 3D scene and not to any independent motions. First, between two frames, images of all objects or parts of the scene that are in fixed positions should satisfy the epipolar geometry constraint. There are particular situations, however, where the epipolar constraint may also be satisfied by a moving object. For example, when an object is being tracked by a camera that is moving in the direction of the object motion.

According to the second constraint, although objects that are in fixed positions in a scene may change in appearance due to camera motion, the shape of the fixed objects should remain invariant with respect to a reference coordinate system. This constraint can be employed over three or more frames. In general, for reliable separation of independently moving objects from the fixed background objects, both is the constraints should be employed.

One embodiment of the present invention uses a plane-plus-parallax decomposition of a multi-view geometry and the principle of invariant projective shape to progressively introduce constraints while concurrently solving the correspondence problem. Multiple images are mutually aligned by progressively solving for the planar and parallax parameters. Regions of the images that can not be aligned with either of the two fundamental constraints are identified as the regions representing independent motion. Progressive introduction of the plane-plus-parallax constraint provides a principled way to decide the applicability of 2D or a 3D model. It also allows the 3D measurements corresponding to the independently moving object to be distinguished from the 3D scene.

The output representation provided by the present invention is a bit mask (with weights) corresponding to the regions that exhibit independent motion and the static scene. This representation is superior to a sparse collection of point correspondences with labels. Also, because it is not realistic to assume that optical flow or normal flow at every point can be computed without constraints, solutions in which a model is fitted to the flow are not acceptable.

The present invention is described in terms of low altitude aerial videos of sparsely cultural scenes. In such scenarios the 3D information may not be very dense. The algorithm, however, is equally applicable to scenarios having intermediate or dense levels of 3D information.

The present invention aligns images based on an underlying 3D rigidity constraint in order to generate a per-pixel labeling of the video. Regions in the images that depart from alignment with the constraints are discovered through a post-processing step and are labeled as independent motions.

In order to handle uncalibrated imaging situations, the present invention implements the 3D constraints in terms of a plane-plus-parallax model. There are three advantages in choosing this representation: (i) situations in which a parametric 2D model may be sufficient can be detected, (ii) the epipolar geometry can be constrained through the planar homography, and (iii) in video data where information is slowly varying, tracking a planar transformation and imposing shape constancy with respect to the common plane is computationally tractable.

The present invention may be implemented using the apparatus shown in FIG. 1. In FIG. 1, a video camera 110 provides successive images to a processor 112 which processes the images, storing the input images, intermediate images and output bit-map data in a multi-frame memory 114. Any of the images or the output bit-map may be displayed on the video display 116. As an alternate to the apparatus described above, the camera 110 may be coupled to an image capture processor 118 (shown in phantom) that captures the successive images and stores them into the multi-frame memory independently of the processor 112. As another alternative, the image processor 112 may be coupled to a parametric transformation processor 120 (shown in phantom), as described in copending U.S. patent application Ser. No. 09/148,661 entitled DIGITAL SIGNAL PROCESSING CIRCUITRY HAVING INTEGRATED TIMING INFORMATION. The parametric transformation processor 120, in turn, may be coupled to a pyramid processor 122 (shown in phantom) that is used by the processor 112 to perform a Laplacian decomposition of the image so that the parametric transform operation may be performed hierarchically on Laplacian images representing respectively different spatial frequency sub-bands of the input image. Although the apparatus shown in FIG. 1 has only one camera, which captures images from different vantage points, it is contemplated that multiple cameras may be used to capture the multiple images.

Given at least three frames in a sequence, the view-invariant shape can be represented with respect to a reference coordinate system as described by equation (1).

$$p' \approx Ap + \kappa e'p''Bp + \kappa e'' \qquad (1)$$

where p is $[x, y, 1]^T$, an imaged point in the reference frame 2 and; p' and p'' are the corresponding points in frames 1 and 3. The matrix $A = M'(R + T'N^T/d_\pi)M^{-1}$ is a planar homography between frame 1 and the reference frame. One skilled in the art can provide a similar expression for the corresponding homography matrix B between frame 3 and the reference frame. The matrixes M' and M are the calibration matrices for the respective images. If the images are taken at different times by a single camera, these matrixes may be the same. If the images are taken from different cameras, each camera has a calibration matrix. The matrixes R and T' are the respective rotation and translation matrixes for frame 1. The vector $e' = \alpha M'T'$ is the epipole in frame 1, and $e'' = \beta M''T''$ is the epipole in frame 3. $\kappa = dP/(Zd_\pi)$ is the invariant shape parameter, where dP is the distance of the 3D point p from the fixed plane, Z is the depth of p and $d_\pi$ is the distance of the fixed plane from the origin, all in the reference frame.

Note that κ remains invariant over views only when the relative scales α and β of the epipoles are correct, otherwise there is a global scaling that relates the κ's at different time instants. Therefore, in order to impose shape constancy, it is desirable to specify the relative scales accurately. As is evident from the constraints, e' and e'' represent the pairwise view constraint for all the pixels, and κ represents the shape constancy constraint for each pixel over all the frames.

Figure 5:
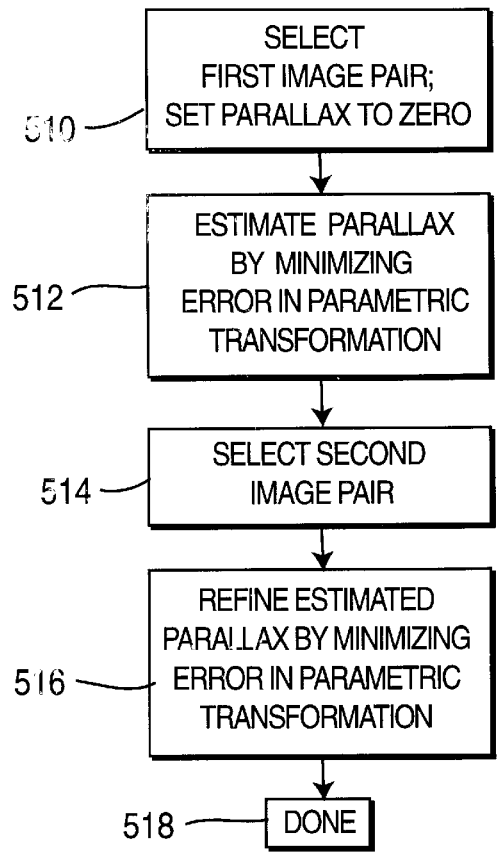
FIG. 5 is a flow-chart diagram that is useful for describing a method by which 3D shape constraints may be calculated as shown in FIG. 2.

When processing a scene having significant 3D content, the present invention imposes shape constancy using at least three frames. As noted earlier, the plane-plus-parallax constraint is employed both to compute shape and to impose shape constancy because it is assumed that dense correspondences are not available. As described below with reference to FIGS. 5 and 6, this constraint is imposed in the process of multi-resolution image alignment using the shape constancy model. The inventors have determined that alignment with model constraints leads to better correspondence estimates than alignment using unconstrained non-parametric optical flows. Because, however, alignment with models is inherently a non-linear problem, the exemplary method uses a strategy of generating good initial guesses and guiding the process through progressively more complex models.

One way to impose shape constancy over three frames is through the trilinear constraints. This method, however, has some disadvantages when the constraint is incorporated into a direct alignment based method using images provided by uncalibrated cameras. The trilinear constraints are implicit constraints relating correspondences over three views. The constraints can be converted into constraints on the spatio-temporal brightness gradients through the brightness constraint equation, but this involves the simultaneous estimation of all the (at least 18) trilinear parameters for the small motion approximation. Also, in order to be able to iteratively warp images and estimate the parameters, the trilinear parameters need to be decomposed into the corresponding camera matrices and shape parameters. This computation may be unreliable.

The present invention makes good use of trilinearity by not imposing the constraints within a direct alignment method but using it, instead, to estimate the consistently scaled epipoles over three frames so that shape constancy can be imposed. By eliminating $\kappa$ from the plane-plus-parallax equations, the following four independent trilinear constraints are obtained:

$$N_1(x''e''_z - e''_x) - N_3(x'e'_z - e'_x) = 0$$

$$N_1(y''e''_z - e''_y) - N_4(x'e'_z - e'_x) = 0$$

$$N_2(x''e''_z - e''_x) - N_3(y'e'_z - e'_y) = 0$$

$$N_2(y''e''_z - e''_y) - N_4(y'e'_z - e'_y) = 0$$

where $N_1 = a_1^T p - x' a_3^T p$, $N_2 = a_2^T p - y' a_3^T p$, $N_3 = b_1^T p - x'' b_3^T p$, $N_4 = b_2^T p - y'' b_3^T p$, and the homography matrixes $A = [a_1^T a_2^T a_3^T]^T$ and $B = [b_1^T b_2^T b_3^T]^T$.

If the two homographies are known, each point correspondence triplet (p, p', p'') satisfies the following constraint system:

$$\begin{bmatrix} N_3 & 0 & -N_3 x' & -N_1 & 0 & N_1 x'' \\ N_4 & 0 & -N_4 x' & 0 & -N_1 & N_1 y'' \\ 0 & N_3 & -N_3 y' & -N_2 & 0 & N_2 x'' \\ 0 & N_4 & -N_4 y' & 0 & -N_2 & N_2 y'' \end{bmatrix} \begin{bmatrix} e' \\ e'' \end{bmatrix} = 0 \quad (2)$$

Given at least two point correspondences, the relatively scaled epipoles can be found. With the knowledge of the epipoles and the corresponding homographies, images can be aligned while solving for a fixed $\kappa$ at every point. Any regions that remain misaligned over a three frame alignment represent independent motions.

The plane-plus-parallax constraint can be employed to do simultaneous parameter estimation and constrained image alignment. To this end, the constraints are written using a small rotation approximation to the equations developed above. In principle, the constraint equations developed above may be used directly in brightness-constraint based image-alignment and parameter estimation. When handling video sequences in which successive frames are related through relatively small rotations, however, the field of view is not too large, and translation in depth is small compared to average depth. Accordingly, the small motion approximation works well in practice. Under this approximation, the 2D points in two images, $p' = [x' y']^T$ and $p = [x\ y]^T$ are related through the plane-plus-parallax transformation shown in equation (3).

$$p' = p - [L(p)\Phi + \kappa(p)Q(p)\Gamma] = p - u(p; \Phi, \Gamma, \kappa, (p)) \quad (3)$$

where $L(p)\Phi$ is the quadratic planar transformation for a reference plane with $$L(p) = \begin{bmatrix} 1 & x & y & 0 & 0 & 0 & x^2 & xy \\ 0 & 0 & 0 & 1 & x & y & xy & y^2 \end{bmatrix},$$

and $\Phi$ is the 8-parameter vector of the unknown parameters. $\kappa$ is the view-invariant projective structure parameter as described above in equation (1).

$$Q(p) = \begin{bmatrix} 1 & 0 & -x \\ 0 & 1 & -y \end{bmatrix},$$

and $\Gamma$ is the epipole. Note that the image points are represented in actual pixel coordinates and all of the unknown calibration parameters are folded into the unknown planar and epipole parameters. A similar constraint can be written for any other frame with respect to the reference frame with $\kappa$ held constant.

In order to perform the plane-plus-parallax constraint based alignment of two or more images, the displacement equation (3) is combined with the brightness constraint equation. The combined constraint equation under a first order approximation can be written as equation (4)

$$\nabla I^T(p) u(p) + (I'(p) - I(p)) = 0 \quad (4)$$

between the reference image I and another image I'. In principle, the shape constancy constraint can be imposed over three or more frames by substituting the expressions for u(p) from equation (3) for each of the frames into the corresponding the respective equations (4), and eliminating the invariant shape parameter $\kappa$. This leads to a trilinear like constraint over three images for the spatio-temporal brightness gradients. The problem, however, in employing such a constraint for detecting independent motions as anomalies, is that the equation does not provide a warping transformation to incrementally warp and bring images closer so that a larger range of displacements can be handled. In the calibrated case, the trilinear parameters may be decomposed into the constituent rotation and translation parameters, allowing depth to be computed. The stability of these computations, however is not well established. In the present invention, it is assumed that calibration information may not be available. Therefore, the plane-plus-parallax model is employed directly to detect independent motion.

The materials that follow describe a general approach for parameter estimation through image alignment. The method described below may be specialized for different stages of the algorithm as described below. Given an estimate (indicated by the superscript $(m)$) of the unknown parameters, $\Phi^{(m)}$, $\Gamma^{(m)}$, and $\kappa^{(m)}(p)$; I' is warped towards I using the model in equation (3):

$$I^w(p) = I'(p - u^{(m)}(p; \Phi^{(m)}, \Gamma^{(m)}, \kappa^{(m)}))$$

With $$\delta u(p) = u(\Phi, \Gamma, \kappa(p)) - u^{(m)}(\Phi^{(m)}, \Gamma^{(m)}, \kappa^{(m)}(p)),$$

the minimization problem shown in equation (5) is solved to compute the increment in the unknown parameters.

$$\min_{\Theta, \Gamma, \kappa(p)} \sum_p \rho(I(p) - I^w(p) + \nabla I^T(p) \delta u(p)), \quad (5)$$

where $\rho(x)$ is a robust error norm such as a Lorentzian. The above function may be minimized using, for example, iterated re-weighted least squares and the Levenberg-Marquardt minimization method. Furthermore, in order to handle a range of displacement fields, the iterative computation may be implemented using a Laplacian pyramid with parameter estimates at coarse levels projected to finer levels for warping and subsequent refinement.

Figure 2:
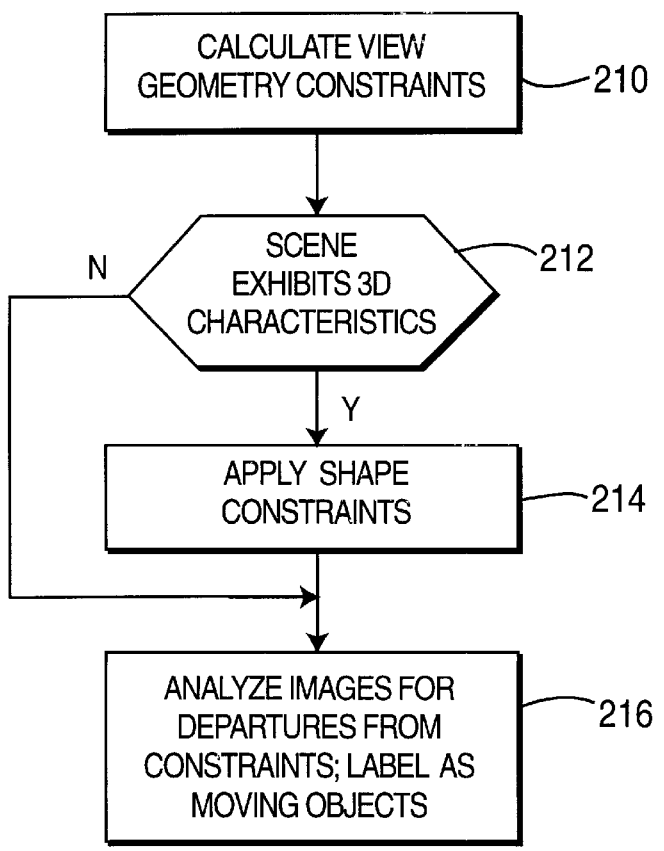
FIG. 2 is a flow-chart diagram that is useful for describing a method according to the present invention.
Figure 3:
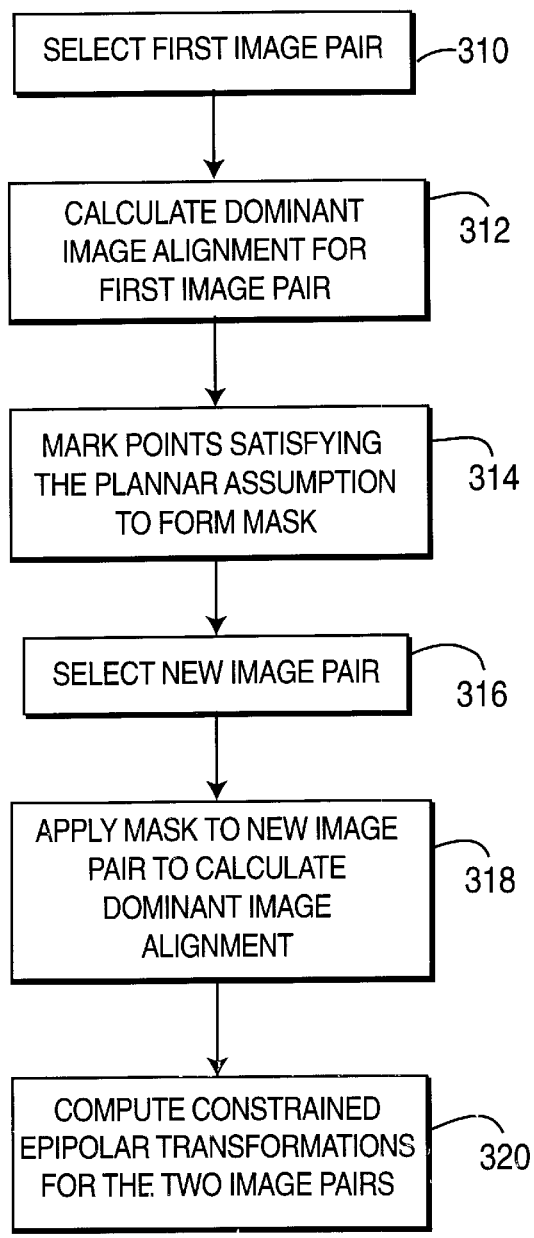
FIG. 3 is a flow-chart diagram that is useful for describing a method by which the 2D view geometry may be calculated as shown in FIG. 2.

FIGS. 2, 3, 4, 5 and 6 are flow-chart diagrams that are useful for describing an exemplary moving object detection method according to the present invention. FIG. 2 illustrates the overall flow of the method. In the first step 210, the method calculates 2D view geometry constraints, as described below with reference to FIGS. 3 and 4. Once these constraints have been calculated, the exemplary method, at step 212, determines if the processed scene exhibits significant 3D characteristics. If it does, then step 214 is executed which applies shape constraints to the image to prevent confounding of fixed 3D objects in the scene with the moving objects that are to be detected. This step is described below with reference to FIGS. 5 and 6.

If no significant 3D characteristics are found in the images at step 212 or if, after step 214, 3D characteristics are found, the method analyzes the images for departures from the constraints and labels any such departures as moving objects. In the exemplary embodiment of the invention, the result of step 212 is a 2D transformation that maps the dominant plane of at least one image into the coordinate system of a reference image. The result of step 214 is a 3D transformation that maps an image including both the dominant plane and fixed 3D objects of the scene into the coordinate system of the reference image. Any groups of points in the scene that differ after the respective transformation operations represent the moving objects that are to be detected.

The exemplary method assumes that the 3D elements of the scene are dominant in the video sequence. It may be desirable, however, to apply the algorithm to aerial videos where the "3Dness" of the scene may be sparse, that is to say, to a video sequence having frames in which either a 2D transformation may suffice or that contains groups of frames in which 3D parallax is rare. While the present invention handles these types of image sequences well, it also works well in other, more conventional scenarios.

Because the method assumes that the 3D elements in the scene are dominant, it is assumed that the epipolar and shape constancy constraints are to be used to evaluate the image. In order to use the epipolar and shape constancy constraints, it is desirable to initialize the planar and epipole parameters. A method according to the present invention may perform this function by first computing a dominant plane transformation, using the image alignment method described above, which sets the invariant shape parameter, κ, to zero and solves for only the planar parameters using robust regression. An exemplar implementation of this method is described below with reference to FIGS. 3 and 4.

In the first step 310, the processor 112 selects a first pair of image frames (e.g. frames 1 and 2 of a frame sequence) from the multi-frame memory 114. At step 312, the processor 112, computes a relatively scaled epipolar transformation for frame 1 with respect to reference to frame 2. In the process of robust regression, points that satisfy the planar assumption are also labeled. At step 314, these labeled points are used to form a mask image for the first image pair. Next, at step 316, a second pair of images (e.g. frames 2 and 3) are selected and, at step 318, using the mask generated in step 314, the corresponding planar transformation for frame 3 into frame 2 is also computed. These two transformations provide a starting point for further computations. The next step 320 computes the relatively scaled epipolar transformations for the two pairs of frames. Equation (2) is used to compute the planar-homography constrained epipoles.

As set forth above, the present invention uses a progressive complexity approach. First the planar homography is calculated, next, the epipoles, constrained by the homography are computed and finally, the 3D shape constraints are calculated. There are a number of advantages with the use of this progressive complexity approach. First, estimation of the epipoles (and the fundamental matrix and the trilinear parameters) are unstable when the transformation is close to a planar homography. Therefore by first finding a dominant homography and assigning points to the homography one can decide if the homography is adequate. Second, if departures from the homography are detected either due to the independent motion or scene parallax, then the homography constrained epipolar computation is relatively stable. Third, in situations where the independent motion may dominate over the residual parallax due to the scene, the homography constrained fundamental matrix/trilinear computation leads to a bad fitting of the data to the model, which can be detected easily.

The planar homography calculated at step 318 is a warping transformation that maps the dominant plane of each image into its respective reference image. Because the camera may be subject to complex motion, this transformation may be a parametric transformation that may be calculated using the parametric transformation processor 120 (shown in FIG. 1), as described in the above-referenced patent application. After the computing the homography step 320 computes the homography-constrained epipoles for the two image pairs. This operation is illustrated by the flow-chart diagram shown in FIG. 4.

With reference to FIG. 2, instead of testing the scene for significant 3D content after computing the constrained epipoles, the method may test the scene after the planar homography has been calculated. If the planar homography indicates only insignificant differences between the frames, it may be sufficient to present any such differences as moving objects to avoid the expense and delay of additional computation.

Figure 4:
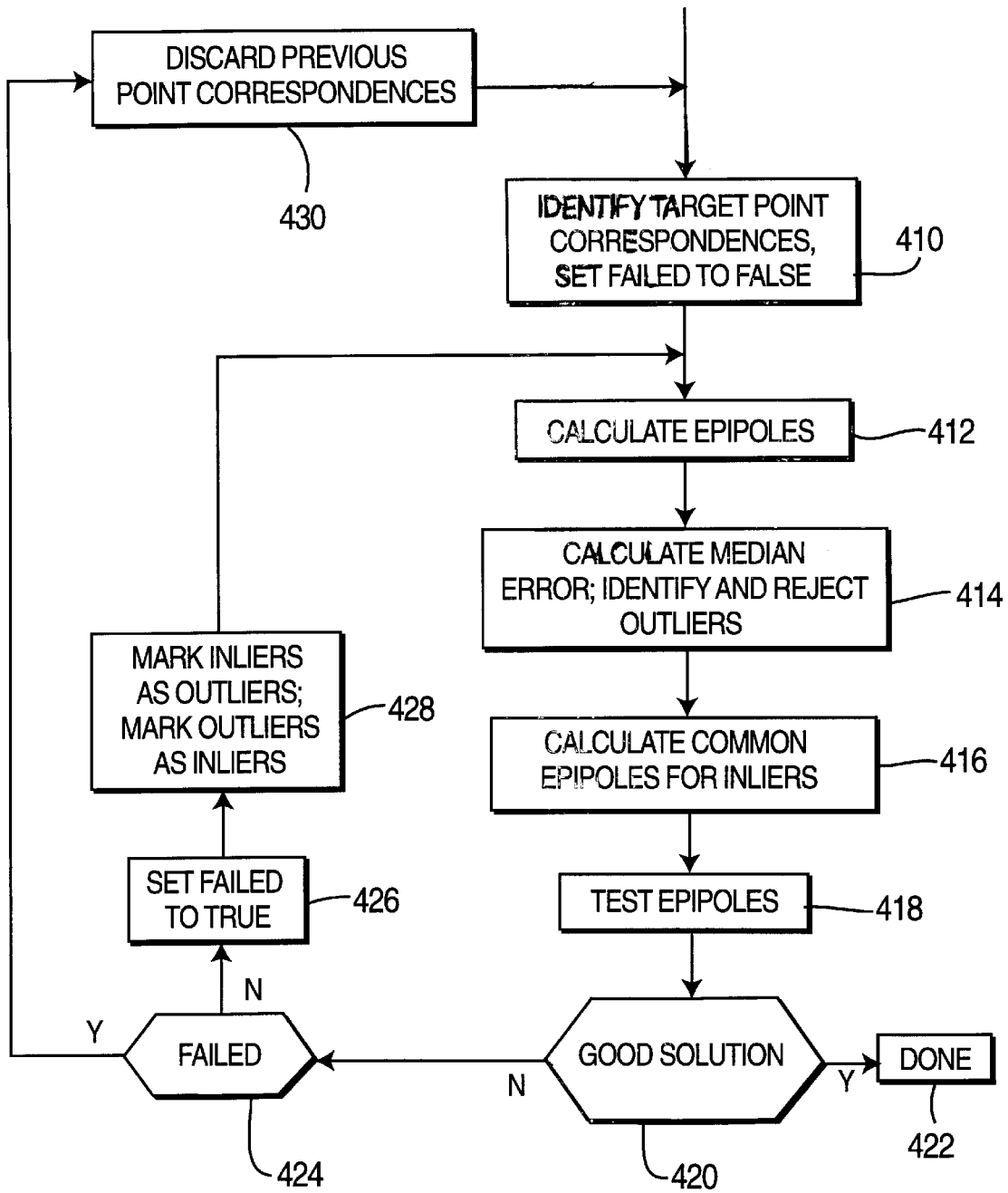
FIG. 4 is a flow-chart diagram that shows an exemplary method for calculating a constrained epipolar geometry as shown in FIG. 3.

In FIG. 4, if there is sufficient support for a 3D computation, step 410 identifies a few good point correspondences between frames 1 and 2 on the one hand and frames 2 and 3 on the other hand. These correspondences may be found, for example, using a combination of correlation based matching at coarse resolutions (i.e. on a high-level Laplacian image provided by the pyramid processor 122, shown in FIG. 1) followed by a sum-of-square-differences based flow vector computation through local regression. Note that the criteria for selection of the good correspondences can be quite stringent as only a few correspondences are needed. Also, up to 50% of these correspondences may be corrupted because, as described below, a robust least median algorithm is used to separate the good correspondences (inliers) from the bad correspondences (outliers). Virtual point correspondences are also generated at step 410 using the homographies computed by the method shown in FIG. 3. Also at step 410, the variable FAILED is set to FALSE.

Using the set of sparse correspondences—those from the homography and from the points outside the plane—a RANSAC like algorithm is applied to an error function based on equation (2). An exemplary RANSAC-like algorithm is described in an article by P. H. S. Torr et al. entitled "Robust Parameterization and computation of the Trifocal Tensor" *Image and Vision Computing*, vol. 24, pp. 271–300 1997. In step 410, random sets of 4 to 6 correspondences are chosen and, at step 412, their epipoles are determined using equation (2). For each solution, the median error is computed at step 414. The solution with the least median error is selected and correspondences having an error greater than the median error are rejected as outliers. Subsequently, at step 416, the inliers, the point correspondences having errors less than or equal to the median error, are analyzed to determine common epipoles for the dominant plane. Next, at step 418, the epipoles are tested to determine if the solution is a good solution. This is done by computing the two fundamental matrices A and B for the two pairs of frames according to the following equation:

$$F'=[e'_x]A \quad F''=[e''_x]B$$

where for any vector v, $[v_x]$ is the rank 2 skew-symmetric matrix representing the cross product operator for the vector. Next at step 418, the perpendicular distance between each point and its epipolar line is computed and the fundamental matrix is accepted only if the errors are less than a threshold.

If the epipolar computation is biased by point correspondences corresponding to the independent motion rather than those corresponding to fixed objects in the scene, the resulting epipole is easily detected, because the epipole for the scene is significantly different from the epipole for the camera motion. The above algorithm detects this anomaly and, at step 420, rejects the estimates. In such a situation, the points that were rejected as "outliers" in step 414 are likely to belong to the scene. Thus, after step 420, if the epipoles calculated at step 416 do not represent a good solution, step 424 is executed which tests the Boolean variable FAILED. If FAILED is not true, then control transfers to step 426 that sets FAILED to TRUE. Next, at step 428, the inliers determined at step 414 are marked as outliers, the outliers are marked as inliers and control transfers to step 412 to re-calculate the epipoles. When the epipoles calculated at step 412 correspond to independent motion but closely mimic the motion of the camera, the shape constancy constraint stage, described below with reference to FIGS. 5 and 6, detect the anomaly. If, after a second pass, no good solution is detected at step 420 then the epipoles have again been biased by independent motion. In this instance, however, the variable FAILED is true and step 424 transfers control to step 430 which discards the previous point correspondences and selects different point correspondences before transferring control to step 410. This process continues until a good set of epipoles are identified at step 420. When this occurs, the method shown in FIG. 4 terminates at step 418.

It is emphasized that the point correspondences computed at this stage may be quite sparse and are typically not adequate to label the whole image as background or as independent motion. Their purpose is only to robustly initialize the view transformations for the next stage of the algorithm, described below with reference to FIGS. 5 and 6.

The computation of the planar and epipole parameters enables the initialization of the image alignment method described above. In an exemplary embodiment of the invention described with reference to FIG. 5, the model constraint based image alignment for three frames is done in two steps. First, at step 510, a first pair of images having corresponding planar homographies and epipole parameters is selected and its parallax is initially set to zero. The actual parallax is computed at step 512 while also refining the view transformation using the minimization described above with reference to equation (5).

Next, at step 514, a second pair of images, also having corresponding planar homographies and epipole parameters are selected. The constancy of parallax determined at step 512 is imposed for the second pair of frames. At step 516, the minimization method of equation (5) is applied, only this time the initial guess of the corresponding view parameters is that computed by the method shown in FIG. 4 but with the parallax kept fixed at the value determined from the first pair of frames. Image regions left misaligned by this step belong to independent motions. Thus, after step 516, the 3D transformation that aligns the images has been determined and, at step 518, the process is complete.

Figure 6:
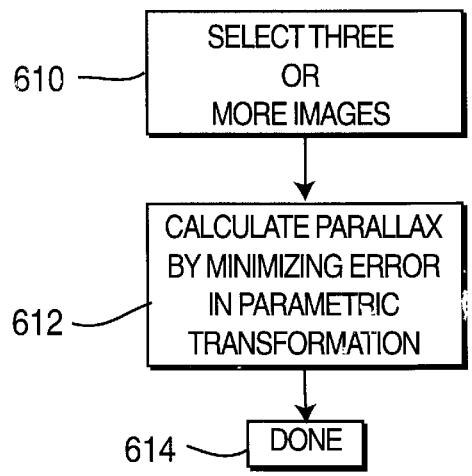
FIG. 6 is a flow-chart diagram that is useful for describing an alternate method by which 3D shape constraints may be calculated as shown in FIG. 2.

FIG. 6 is a flow-chart diagram that represents an alternative embodiment of the invention, in which the minimization of equation (5) is solved as a multi-frame problem with three or more frames and the parallax is kept the same across all the frames. In this process, step 610 selects three or more images and step 612 calculates minimized error in the parametric transformation using the epipoles calculated by the method shown in FIG. 4 and adjusting the parallax parameter from an initial value of zero.

The final step is the detection of independent motions using the warped images after the motion and shape constraint based alignment using the parametric transforms determined as described above, a locally integrated normal flow-like measure is used to detect and label regions of misalignment. An exemplary integrated normal flow-like measure is described in an article by M. Irani et al. entitled "Computing Occluding and Transparent Motions," *International Journal of Computer Vision*, vol. 12, pp. 5–16, 1994. This operation corresponds to step 216, described above with reference to FIG. 2.

It is contemplated that the subject invention may be implemented as a computer program residing on a carrier such as a magnetic disk, optical disk, radio frequency (RF) carrier wave or audio frequency (AF) carrier wave. The exemplary computer program controls a general purpose computer to perform the method described above.

Although the invention has been described in terms of an exemplary embodiment, it is contemplated that it may be practiced as outlined above within the scope of the following claims.

What is claimed is:

1. A method for detecting independently moving objects in a video sequence of successive images of a three-dimensional (3D) scene at least two of the images being taken from respectively different camera positions, the method comprising the steps of:

selecting a group of images including the at least two images taken from different camera positions;

calculating a set of two-dimensional (2D) view geometry constraints for the group of images;

testing the 2D view geometry constraints to determine if the imaged scene exhibits significant 3D characteristics;

if the imaged scene exhibits significant 3D characteristics, calculating a set of 3D shape constraints for the group of images, wherein the 3D shape constraints are constrained by the 2D view geometry constraints; and if the imaged scene exhibits significant 3D characteristics, identifying areas in the group of images that are inconsistent with 3D constraints as areas corresponding to the moving objects.

2. A method according to claim 1, further including the step of, if the imaged scene does not exhibit significant 3D characteristics, identifying areas in the group of images that are inconsistent with the 2D constraints as areas corresponding to the moving objects.

3. A method according to claim 1, wherein the step of calculating the 2D view geometry constraints includes the step of computing respective dominant image alignments for successive pairs of images.

4. A method according to claim 3, wherein the step of calculating the 2D view geometry constraints further includes the step of computing epipolar geometries for the successive image pairs, wherein the epipolar geometries are constrained by the respective dominant image alignments.

5. A method according to claim 4, wherein the step of computing epipolar geometries for the successive image pairs includes the steps of:
- selecting a plurality of target point correspondences among the successive images;
- calculating respective epipolar geometries for each of the plurality of target point correspondences;
- calculating a median error for each calculated epipolar geometry; and
- selecting one of the epipolar geometries having a minimum median error as the 2D view geometry of the scene.

6. A method according to claim 5, further including the steps of:
- comparing the point correspondences to the selected epipolar geometry to separate the point correspondences into inlier point correspondences that conform to the selected epipolar geometry and outlier point correspondences that do not conform to the selected epipolar geometry;
- calculating a refined epipolar geometry responsive to the inlier point correspondences;
- testing the refined epipolar geometry against the sequence of images to determine if the refined epipolar geometry corresponds to the dominant plane of the images or to ones of the moving objects and, if the epipolar geometry corresponds to the dominant plane, providing the epipolar geometry as the 2D view geometry of the scene;
- if the refined epipolar geometry is determined to correspond to the ones of the moving objects, redefining the inlier point correspondences as further outlier point correspondences and the outlier point correspondences as further inlier point correspondences, calculating a further refined epipolar geometry responsive to the further inlier point correspondences and providing the further refined epipolar geometry as the 2D view geometry of the scene.

7. A method according to claim 6, further including the steps of:
- selecting a first pair of images of the sequence of images;
- estimating a parallax geometry for the first pair of images by selecting an initial estimate of the parallax geometry and adjusting the estimated parallax geometry to iteratively minimize errors in a parametric alignment of the first pair of images;
- selecting a second pair of images of the sequence of images; and
- estimating a further parallax geometry for the second pair of images by further adjusting the estimated parallax geometry to minimize errors in a parametric alignment of the second pair of images.

8. Apparatus for detecting independently moving objects in a video sequence of successive images of a three-dimensional (3D) scene at least two of the images being taken from respectively different camera positions, the apparatus comprising:
- a video camera and a memory which are controlled to obtain a group of images of the sequence of images, the group of images including the at least two images taken from different camera positions;
- means for calculating a set of two-dimensional (2D) view geometry constraints for the group of images;
- means for testing the 2D view geometry constraints to determine if the imaged scene exhibits significant 3D characteristics;
- means for calculating a set of 3D shape constraints for the group of images if the imaged scene exhibits significant 3D characteristics, wherein the 3D shape constraints are constrained by the 2D view geometry constraints; and
- means for identifying areas in the group of images that are inconsistent with 3D constraints as areas corresponding to the moving objects if the imaged scene exhibits significant 3D characteristics.

9. Apparatus according to claim 8, further including means for identifying areas in the group of images that are inconsistent with the 2D constraints as areas corresponding to the moving objects if the imaged scene does not exhibit significant 3D characteristics.

10. Apparatus according to claim 8, wherein the means for calculating the set of 2D view geometry constraints includes means for computing respective dominant image alignments for successive pairs of images.

11. Apparatus according to claim 10, wherein the means for calculating the set of 2D view geometry constraints includes a pyramid processor that calculates a Laplacian decomposition of each image and means for calculating a parametric transformation between images in each successive pair of images by calculating the parametric transformation between successive levels of the respective Laplacian decompositions of the images.

12. Apparatus according to claim 10, wherein the means for calculating the 2D view geometry constraints further includes means for computing epipolar geometries for the successive image pairs, wherein the epipolar geometries are constrained by the respective dominant image alignments.

13. Apparatus according to claim 12, wherein the means for computing epipolar geometries for the successive image pairs includes:
- means for selecting a plurality of target point correspondences from among the successive images;
- means for calculating respective epipolar geometries for each of the plurality of target point correspondences;
- means for calculating a median error for each calculated epipolar geometry; and
- means for selecting one of the epipolar geometries having the minimum median error as the 2D view geometry of the scene.

14. Apparatus according to claim 13, further including:
- means for comparing the point correspondences to the selected epipolar geometry to separate the point correspondences into inlier point correspondences that conform to the selected epipolar geometry and outlier point correspondences that do not conform to the selected epipolar geometry;
- means for calculating a refined epipolar geometry responsive to the inlier point correspondences;
- means for testing the refined epipolar geometry against the sequence of images including:
  - means for determining if the refined epipolar geometry corresponds to the dominant plane of the images or to ones of the moving objects; and
  - means for providing the refined epipolar geometry as the 2D view geometry of the scene if the refined epipolar geometry corresponds to the dominant plane;

means for redefining the inlier point correspondences as further outlier point correspondences and the outlier point correspondences as further inlier point correspondences if the refined epipolar geometry is determined to correspond to the ones of the moving objects, and for calculating a further refined epipolar geometry responsive to the further inlier point correspondences and for providing the further refined epipolar geometry as the 2D view geometry of the scene.

15. Apparatus according to claim 14, further including:

means for selecting a first pair of images of the sequence of images;

means for estimating a parallax geometry for the first pair of images by selecting an initial estimate of the parallax geometry and adjusting the estimated parallax geometry to iteratively minimize errors in a parametric alignment of the first pair of images;

means for selecting a second pair of images of the sequence of images; and means for estimating a further parallax geometry for the second pair of images by further adjusting the estimated parallax geometry to minimize errors in a parametric alignment of the second pair of images.

16. An article of manufacture comprising a carrier including a plurality of computer program instructions, the computer program instructions causing a general purpose computer to perform a method of detecting independently moving objects in a video sequence of successive images of a three-dimensional (3D) scene, at least two of the images being taken from respectively different camera positions, the method comprising the steps of:

selecting a group of images including the at least two images taken from different camera positions;

calculating a set of two-dimensional (2D) view geometry constraints for the group of images;

testing the 2D view geometry constraints to determine if the imaged scene exhibits significant 3D characteristics;

if the imaged scene exhibits significant 3D characteristics, calculating a set of 3D shape constraints for the group of images, wherein the 3D shape constraints are constrained by the 2D view geometry constraints; and if the imaged scene exhibits significant 3D characteristics, identifying areas in the group of images that are inconsistent with 3D constraints as areas corresponding to the moving objects.

17. An article of manufacture according to claim 16 wherein the computer program instructions that cause the computer to calculate the 2D view geometry constraints include instructions that cause the computer to calculate respective dominant image alignments for successive pairs of images.

18. An article of manufacture according to claim 17, wherein the computer program instructions that cause the computer to calculate the 2D view geometry constraints further include computer program instructions that cause the computer to calculate epipolar geometries for the successive image pairs, wherein the epipolar geometries are constrained by the respective dominant image alignments.

19. An article of manufacture according to claim 18, wherein the computer program instructions that cause the computer to calculate the epipolar geometries for the successive image pairs include computer program instructions that cause the computer to perform the steps of:

selecting a plurality of target point correspondences among the successive images;

calculating respective epipolar geometries for each of the plurality of target point correspondences;

calculating a median error for each calculated epipolar geometries; and selecting one of the epipolar geometries having the minimum median error as the 2D view geometry of the scene.

20. An article of manufacture according to claim 19 further including computer program instructions that cause the computer to perform the steps of:

comparing the point correspondences to the selected epipolar geometry to separate the point correspondences into inlier point correspondences that conform to the selected epipolar geometry and outlier point correspondences that do not conform to the selected epipolar geometry;

calculating a refined epipolar geometry responsive to the inlier point correspondences;

testing the refined epipolar geometry against the sequence of images to determine if the refined epipolar geometry corresponds to the dominant plane of the images or to ones of the moving objects and if the epipolar geometry corresponds to the dominant plane, providing the epipolar geometry as the 2D view geometry of the scene;

if the refined epipolar geometry is determined to correspond to the ones of the moving objects, redefining the inlier point correspondences as further outlier point correspondences and the outlier point correspondences as further inlier point correspondences, calculating a further refined epipolar geometry responsive to the further inlier point correspondences and providing the further refined epipolar geometry as the 2D view geometry of the scene.

21. An article of manufacture according to claim 20, further including computer program instructions that cause the computer to perform the steps of:

selecting a first pair of images of the sequence of images;

estimating a parallax geometry for the first pair of images by selecting an initial estimate of the parallax geometry and adjusting the estimated parallax geometry to iteratively minimize errors in a parametric alignment of the first pair of images;

selecting a second pair of images of the sequence of images; and estimating a further parallax geometry for the second pair of images by all further adjusting the estimated parallax geometry to minimize errors in a parametric alignment of the second pair of images.

* * * * *